United States Patent
Larson

(10) Patent No.: US 10,655,750 B2
(45) Date of Patent: May 19, 2020

(54) APPARATUS AND METHOD FOR ENGAGING AN APPLIANCE CLOSURE VALVE

(71) Applicant: Brian Larson, Ovideo, FL (US)

(72) Inventor: Brian Larson, Ovideo, FL (US)

(*) Notice: Subject to any disclaimer, the term of this patent is extended or adjusted under 35 U.S.C. 154(b) by 109 days.

(21) Appl. No.: 15/906,180

(22) Filed: Feb. 27, 2018

(65) Prior Publication Data

US 2018/0252331 A1 Sep. 6, 2018

Related U.S. Application Data

(60) Provisional application No. 62/464,732, filed on Feb. 28, 2017.

(51) Int. Cl.
*F16K 31/60* (2006.01)
*F16K 31/46* (2006.01)

(52) U.S. Cl.
CPC ............ *F16K 31/607* (2013.01); *F16K 31/46* (2013.01)

(58) Field of Classification Search
CPC .... F16K 31/607; F16K 31/465; F16K 31/535; F16K 31/46; F16K 31/60; F16K 27/02; A47J 37/0786; A47J 37/0713; F23N 1/007; F23N 2023/38; Y10T 16/4719; Y10T 16/459; Y10T 74/20738; Y10S 16/24; Y10S 16/30
USPC .................... 251/293; 16/422, 426, 428, 427
See application file for complete search history.

(56) References Cited

U.S. PATENT DOCUMENTS

| 1,386,161 A | 8/1921 | Clifford |
| 1,573,287 A * | 2/1926 | Williams, Jr. .......... F16K 31/46 251/293 |
| 2,711,199 A | 6/1955 | Salsberg |
| 2,747,384 A | 5/1956 | Beam |
| 2,756,088 A * | 7/1956 | Sutter ................... E05B 1/0053 292/347 |
| 2,796,101 A | 6/1957 | Hasemann et al. |
| 2,958,349 A | 11/1960 | McNutt |
| 4,665,386 A * | 5/1987 | Haws .................. F16K 37/0041 116/112 |
| 4,876,929 A | 10/1989 | Kozak |
| 8,967,197 B1 * | 3/2015 | Teel, Jr. .................. A47J 37/07 137/377 |
| 9,562,622 B2 | 2/2017 | Civilla |
| 2013/0213382 A1 * | 8/2013 | Barber ................ A47J 37/0713 126/25 R |

(Continued)

*Primary Examiner* — Craig J Price
*Assistant Examiner* — Andrew J Rost
(74) *Attorney, Agent, or Firm* — Beusse, Wolter, Sanks & Maire PLLC; Robert L. Wolter

(57) ABSTRACT

An apparatus is provided for engaging a closure valve. The apparatus includes an extension shaft having a first end and a second end and a handle attached to the first end of the extension shaft. The apparatus also includes a handle attachment device attached to the second end of the extension shaft and adapted to fit over and around a rotatable knob of the closure valve. The handle attachment device includes a housing having a first non-pivoting catch and a second pivoting catch on an underside thereof that each extend radially inward toward a center of the housing such that each catch is configured to engage a lower surface of the rotatable knob when the housing is fit over and around the rotatable knob. A method is also provided for using the apparatus to engage a closure valve.

15 Claims, 15 Drawing Sheets

(56) References Cited

U.S. PATENT DOCUMENTS

2014/0027659 A1\* 1/2014 Kumar ................... F16K 31/46
　　　　　　　　　　　　　　　　　　　　　　　　251/213
2015/0159773 A1\* 6/2015 Civilla ................. F16K 31/465
　　　　　　　　　　　　　　　　　　　　　　　　251/294

\* cited by examiner

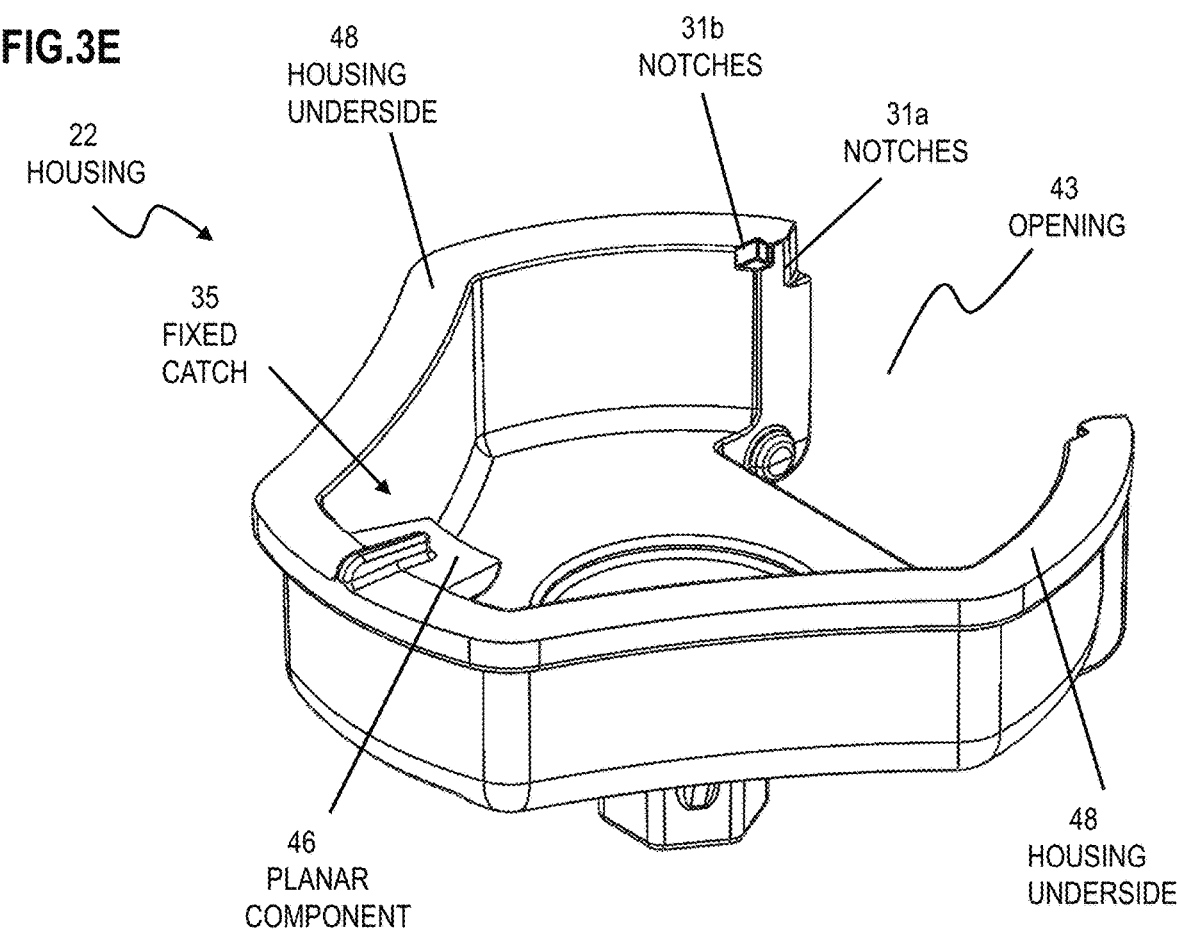
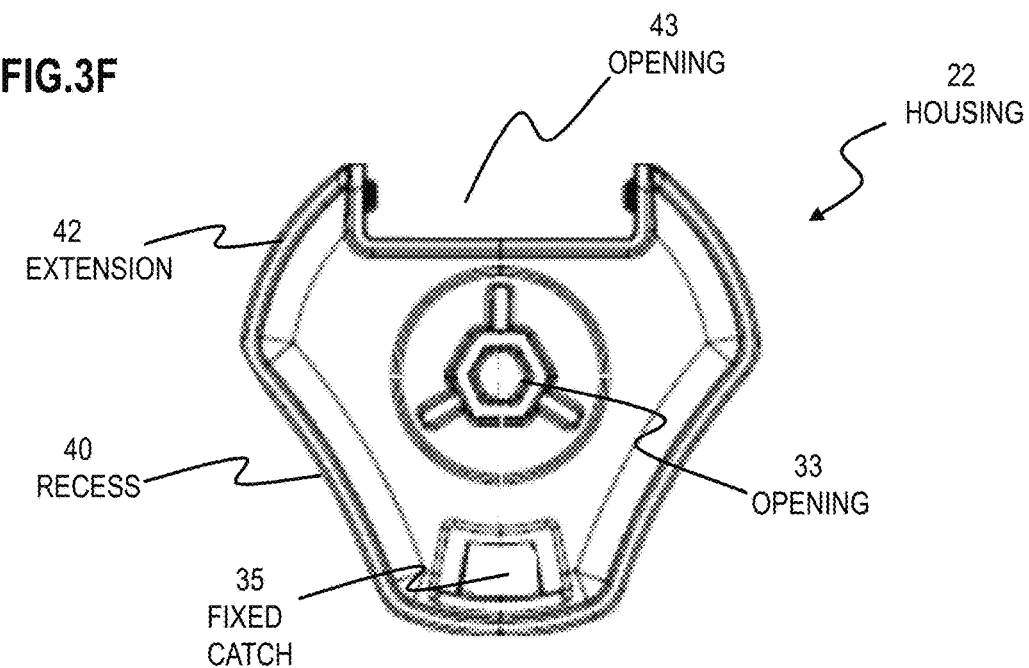

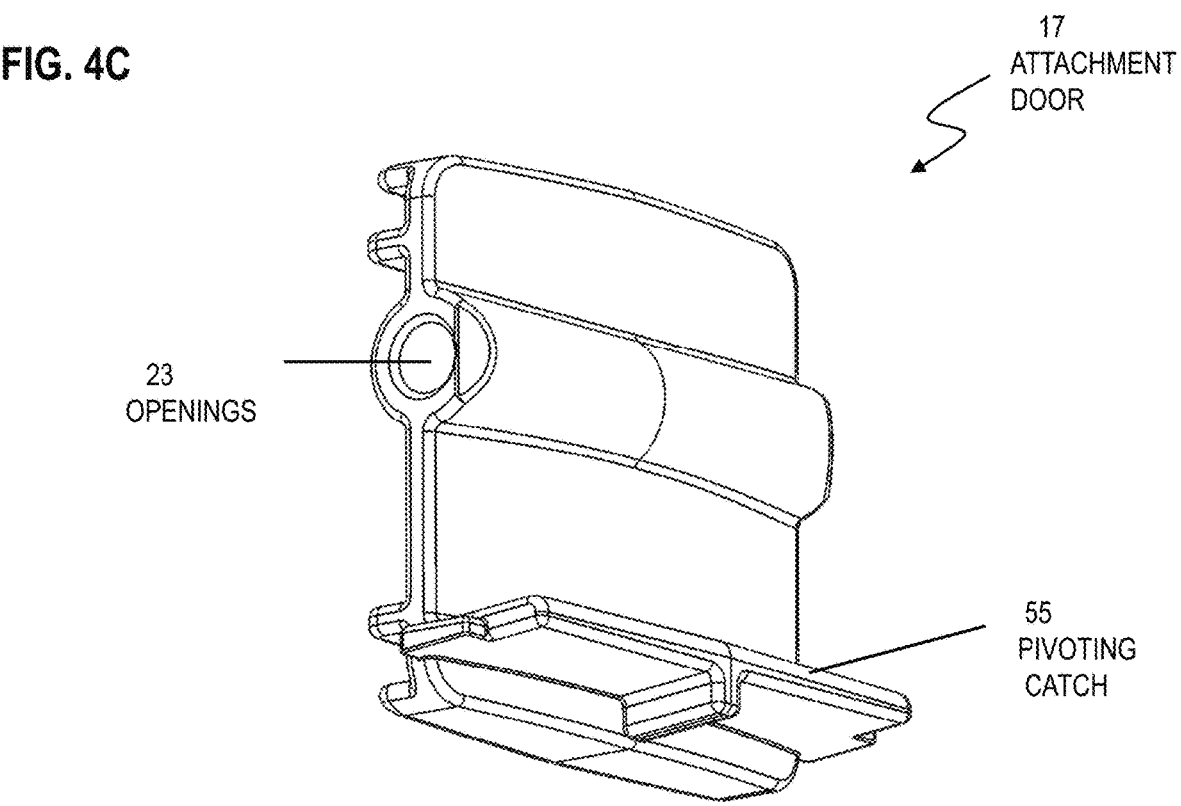

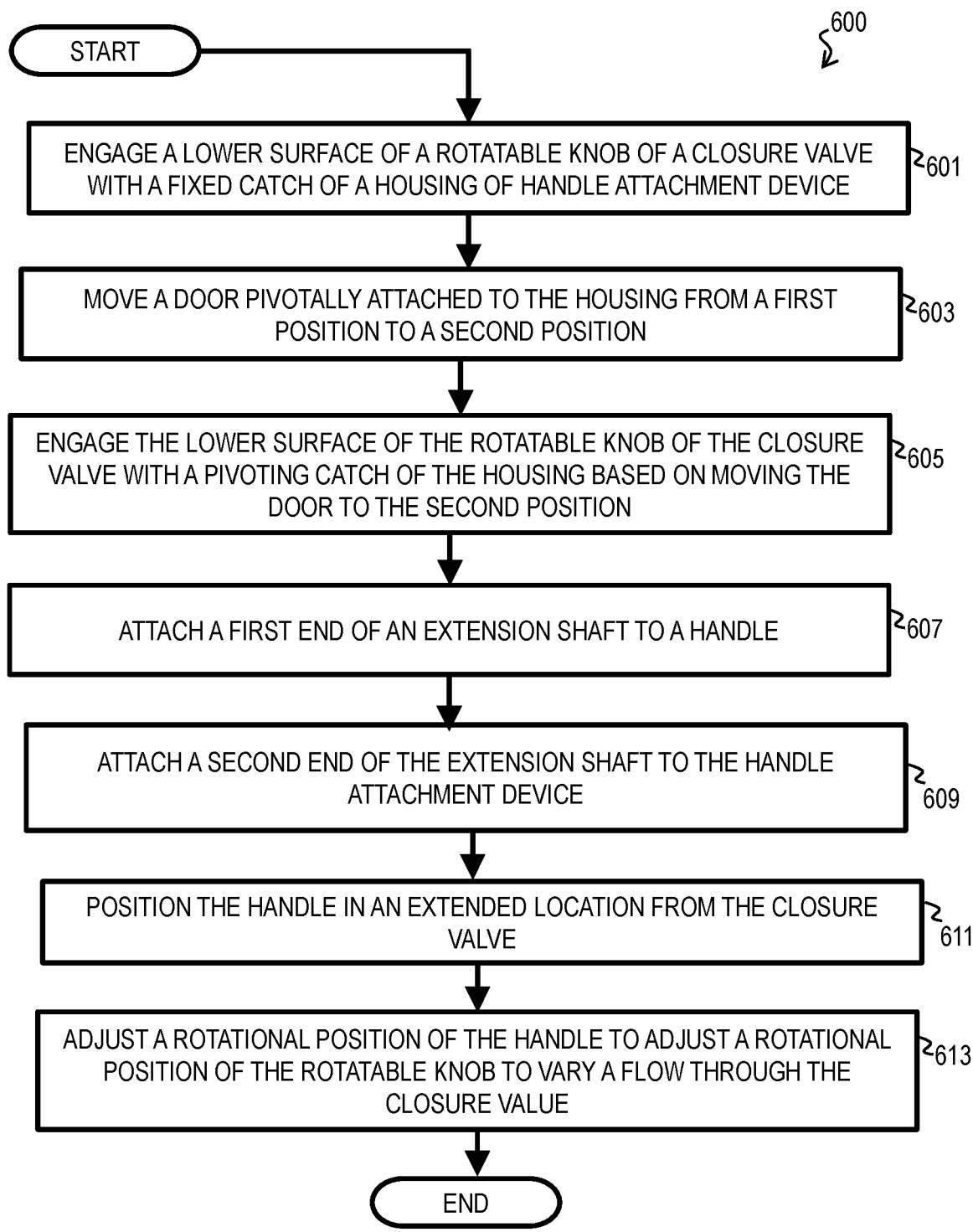

30 RECEIVING SLOT

26 MOUNT STABILIZER

26 MOUNT STABILIZER

30 RECEIVING SLOT

APPARATUS AND METHOD FOR ENGAGING AN APPLIANCE CLOSURE VALVE

CROSS-REFERENCE TO RELATED APPLICATIONS

This application claims benefit of Provisional Appln. 62/464,732, filed Feb. 28, 2017, the entire contents of which are hereby incorporated by reference as if fully set forth herein, under 35 U.S.C. § 119(e).

BACKGROUND

Propane tanks are used in various indoor and outdoor venues as grilling equipment for cooking or other industrial and recreational purposes. When using propane-fueled cooking grills, in addition to the closure valve on the propane tank itself, there are operating valves on the appliance with handles in close proxmity of the user. For instance, on a multi-burner propane grill, there is typically a separate valve for starting, throttling, and stopping propane to each burner. While these separate operating valves will nominally stop the flow of propane at the burner, propane gas grill manufacturers strongly recommended that the closure valve on the propane tank is secured between uses of the grill, rather than relying on the operating burner valves of the grill to stop the flow of propane to each burner.

Specific instances of dangerous scenarios of a propane tank not being turned off include wildlife animals chewing through the rubber or plastic propane gas lines connecting the propane tank to the grill burners, extended exposure of the propane gas line to weathering, and children at play causing accidental bumping into controls of the grill burners. Any of these scenarios could cause a potentially dangerous propane gas leak if the closure valve is not closed, thereby leading to a possible serious fire or explosion hazard.

Unfortunately, many users do not observe this recommendation to secure the closure valve of the propane tank between uses of the grill. Inconvenience is a leading cause users give for not turning off the closure valve, since the closure valve is relatively difficult and awkward to reach even in a relative simple propane grill. Additionally, immediately after use the grill remains quite hot and thus users also avoid turning off the closure valve because of the potential burn that can result in reaching the closure valve in proximity to the grill.

SUMMARY

In a first set of embodiments, an apparatus is provided for engaging a closure valve. The apparatus includes an extension shaft having a first end and a second end and a handle attached to the first end of the extension shaft. The apparatus also includes a handle attachment device attached to the second end of the extension shaft and adapted to fit over and around a rotatable knob of the closure valve. The handle attachment device includes a housing having a first non-pivoting catch and second pivoting catch on an underside of the housing. The first non-pivoting catch and second pivoting catch each extend radially inward toward a center of the housing such that the first non-pivoting catch and second pivoting catch are configured to engage a lower surface of the rotatable knob when the housing is fit over and around the rotatable knob.

In a second set of embodiments, an apparatus is provided for engaging a closure valve. The apparatus includes an extension shaft having a first end and a second end and a handle attached to the first end of the extension shaft. The apparatus also includes a handle attachment device attached to the second end of the extension shaft and adapted to fit over and around a rotatable knob of the closure valve. The handle attachment device includes a housing having a first and second catch on an underside thereof that extend radially inward toward a center of the housing such that the first and second catch are configured to engage a lower surface of the rotatable knob when the housing is fit over and around the rotatable knob. The first and second catch are located at radially opposite positions relative to each other.

In a third set of embodiments, a method is provided for engaging a closure valve. The method includes engaging a lower surface of a rotatable knob of the closure valve with a first non-pivoting catch on an underside of a housing of a handle attachment device, where the first non-pivoting catch extends radially inward toward a center of the housing. The method also includes moving an attachment door pivotally attached to the housing from a first position to a second position. The method also includes engaging the lower surface of the rotatable knob with a second pivoting catch that extends radially toward the center of the housing based on moving the attachment door from the first position to the second position. The second pivoting catch is located radially opposite from the first non-pivoting catch.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3E is an image that illustrates an example of a bottom perspective view of a housing of the handle attachment device FIG. 1, according to an embodiment;

FIG. 3F is an image that illustrates an example of a top view of a housing of the handle attachment device FIG. 1, according to an embodiment;

FIG. 4C is an image that illustrates an example of a lower front perspective view of a pivoting catch of the handle attachment device of FIG. 1, according to an embodiment;

FIG. 6 is a flow diagram that illustrates an example of a method for engaging a closure valve, according to an embodiment;

DETAILED DESCRIPTION

A method and apparatus are described for engaging a closure valve. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about x" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of an apparatus and method for engaging a closure valve. In one embodiment, the closure valve is used to adjust a flow of fluid passing through a passage or opening. In one embodiment, the closure valve is used in conjunction with an appliance where the closure valve is positioned out of reach of a user while the user is operating the appliance. In an embodiment, the closure valve is on a propane tank used in conjunction with a grill. In another embodiment, the closure valve on the propane tank is used in conjunction with recreational vehicles (RV), watercraft (e.g. boat), a forklift, a lawn mower and a tractor. In still other embodiments, the closure valve is any rotatable valve including a water spigot or a stop valve (e.g. toilet stop valve).

Figure 1:
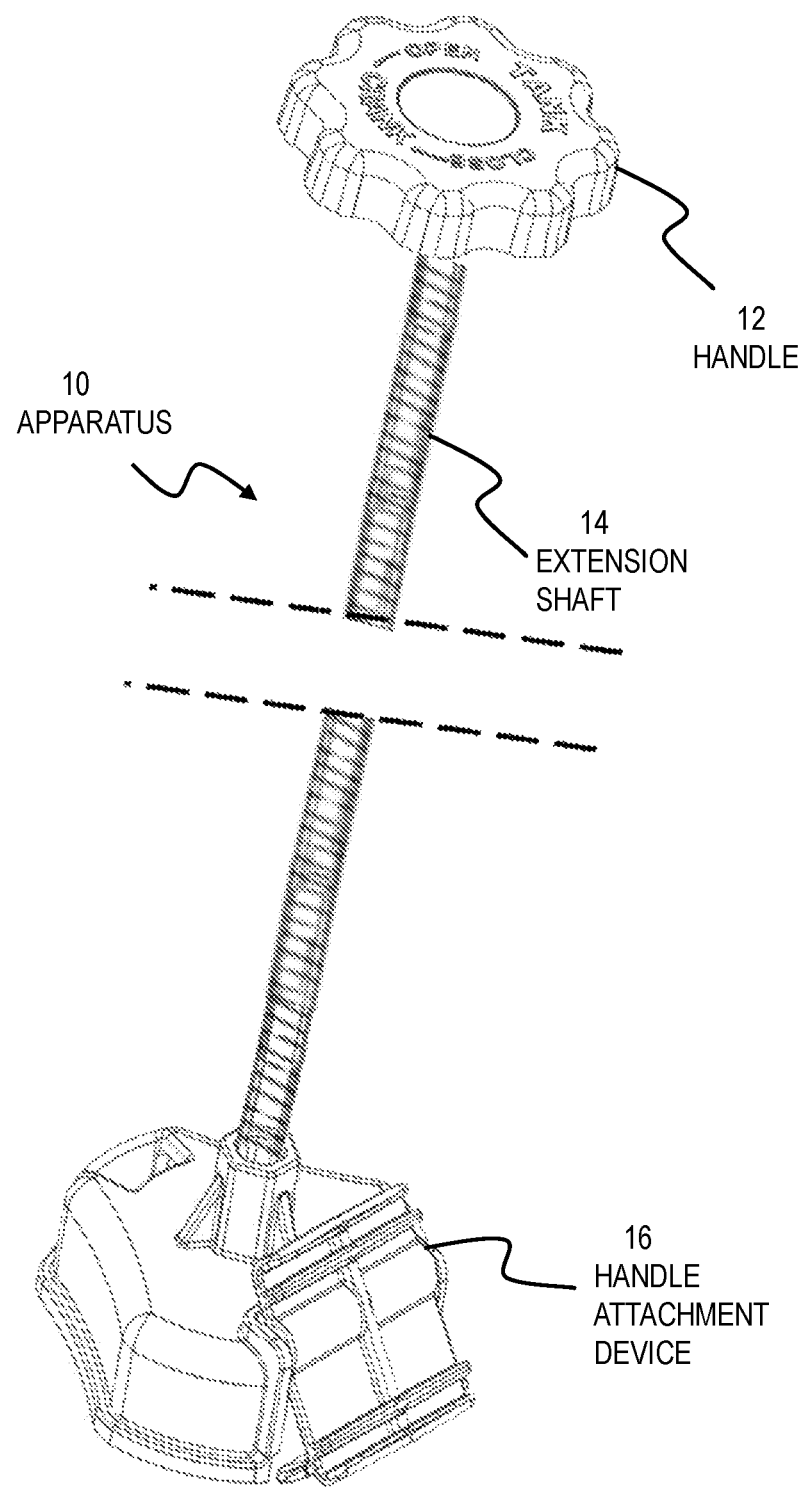
FIG. 1 is an image that illustrates an example of a side perspective view of an apparatus for engaging a closure valve, according to an embodiment.

FIG. 1 is an image that illustrates an example of a side perspective view of an apparatus 10 for engaging a closure valve, according to an embodiment. In an embodiment, the apparatus 10 includes an extension shaft 14 with a first end and a second end. In an example embodiment, the extension shaft 14 has an internal flexible or straight shaft of any suitable length. In one embodiment, the extension shaft 14 is made of hex rod material with a stainless steel casing. In an example embodiment, the extension shaft 14 is similar to the Flexible Shaft Driver Extension manufactured by Illinois Industrial Tool, Bolingbrook Ill. In an example embodiment, the extension shaft 14 has a length in a range from about 30" to about 33". A handle 12 is attached to the first end of the extension shaft 14. A handle attachment device 16 is attached to the second end of the extension shaft 14. The attachment of the first and second ends of the extension shaft 14 to the respective handle 12 and handle attachment device 16 is configured such that the handle 12 is rotatably coupled to the handle attachment device 16. When the handle 12 is rotated in a first direction (e.g. clockwise), the handle attachment device 16 rotates in the same first direction and when the handle 12 is rotated in a second direction (e.g. counterclockwise) opposite to the first direction, the handle attachment device 16 rotates in the same second direction.

Figure 2A:
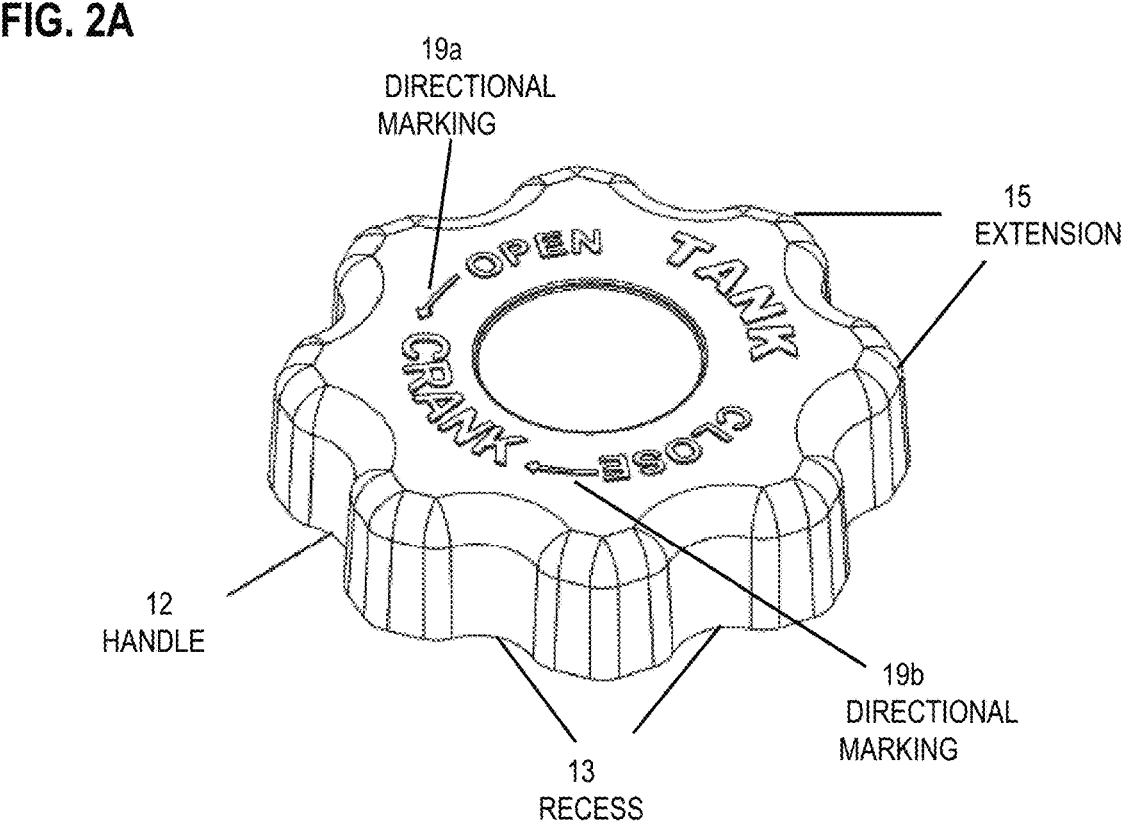
FIG. 2A is an image that illustrates an example of a top perspective view of a handle of the apparatus of FIG. 1, according to an embodiment.
Figure 2B:
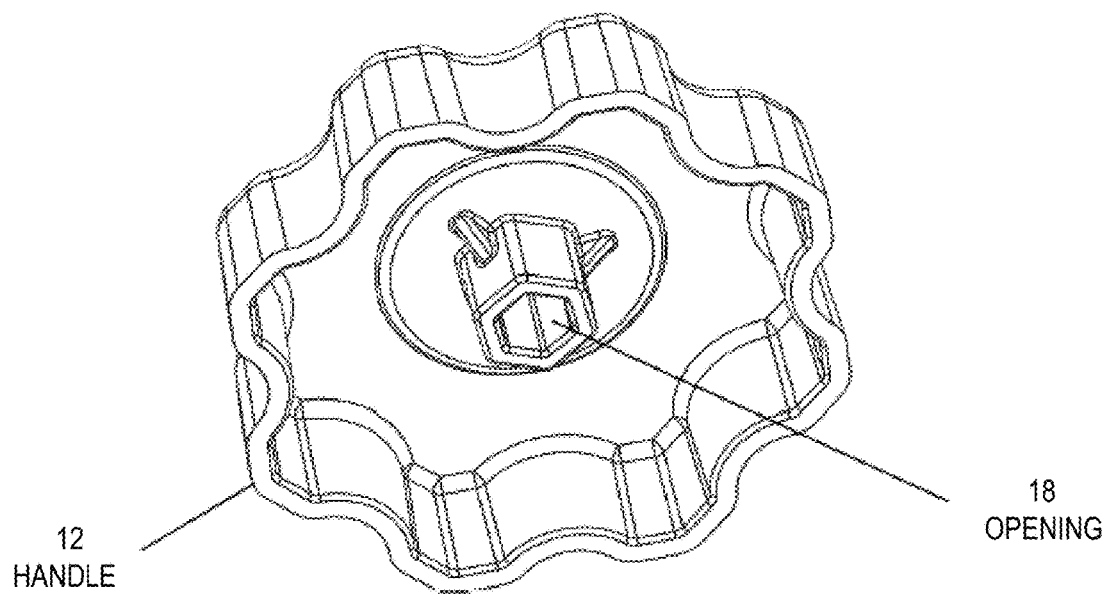
FIG. 2B is an image that illustrates an example of a bottom perspective view of a handle of the apparatus of FIG. 1, according to an embodiment.

FIG. 2A is an image that illustrates an example of a top perspective view of the handle 12 of the apparatus 10 of FIG. 1, according to an embodiment. FIG. 2B is an image that illustrates an example of a bottom perspective view of the handle 12 of the apparatus 10 of FIG. 1, according to an embodiment. In an embodiment, the handle 12 has a contour that is easy for a user to grip while using the apparatus 10. In one example embodiment, the contour of the handle 12 includes a plurality of extensions 15 and recesses 13, where each recess 13 is positioned between a pair of extensions 15 and the extensions 15 have a greater radial separation from a center of the handle 12 (e.g. opening 18) than the recesses 13. In one embodiment, the handle 12 has an octagonal shape with eight extensions 15 and eight recesses 13, as depicted in FIGS. 2A-2B. One advantage of the octagonal shape handle 12 is that it is relatively easy to grip. However, in other embodiments, the handle 12 can take any shape provided that it can be easily grasped and turned by the user. In an example embodiment, the handle 12 is made from nylon-based plastic material. In an example embodiment, a diameter of the handle 12 is about 2½ inches or in a range from about 2 inches to about 3 inches.

In an embodiment, the handle 12 includes directional markings 19a, 19b including one directional marking 19a that indicates a first direction (e.g. counter clockwise) to open the closure valve when the handle 12 and apparatus 10 are attached to the closure valve and another directional marking 19b that indicates a second direction (e.g. clockwise) to close the closure valve. In an example embodiment, the handle 12 also includes words to indicate the direction (e.g. "open" for the counter clockwise direction, "close" for the clockwise direction).

In an embodiment, the handle 12 includes an opening 18 at a center of the handle 12. In an embodiment, the opening 18 has a cross-section that is complimentary with a cross section of the first end of the extension shaft 14. In an example embodiment, the cross section of the opening 18 has a non-circular shape such as a square, pentagon, hexagon or any polygon sided shape. A hexagon shaped cross-section of the opening 18 is depicted in FIG. 2B. In an embodiment, the first end of the extension shaft 14 is axially inserted into the opening 18 and is affixed within the opening 18 using clips, clamps, brackets, slide fittings, threaded fittings snap fittings, screws, glues or other suitable bonding agent or attachment method. In an example embodiment, the slide fitting between the first end of the extension shaft 14 and the opening 18 is based on the opening 18 having a tapered inner diameter such that the first end of the extension shaft 14 is secured along the tapered inner diameter of the opening 18. In one embodiment, the extension shaft 14 has male ends that are received within the opening 18 of the handle 12 (and opening 33 of the housing 22). In another embodiment, the extension shaft 14 has female openings at each end that receive a male end on the handle 12 and the housing 22 (e.g. where the openings 18, 33 are located). In an example embodiment, an inner diameter of the opening 18 is about 7 millimeters (mm) or in a range from about 5 mm to about 10 mm.

Figure 3A:
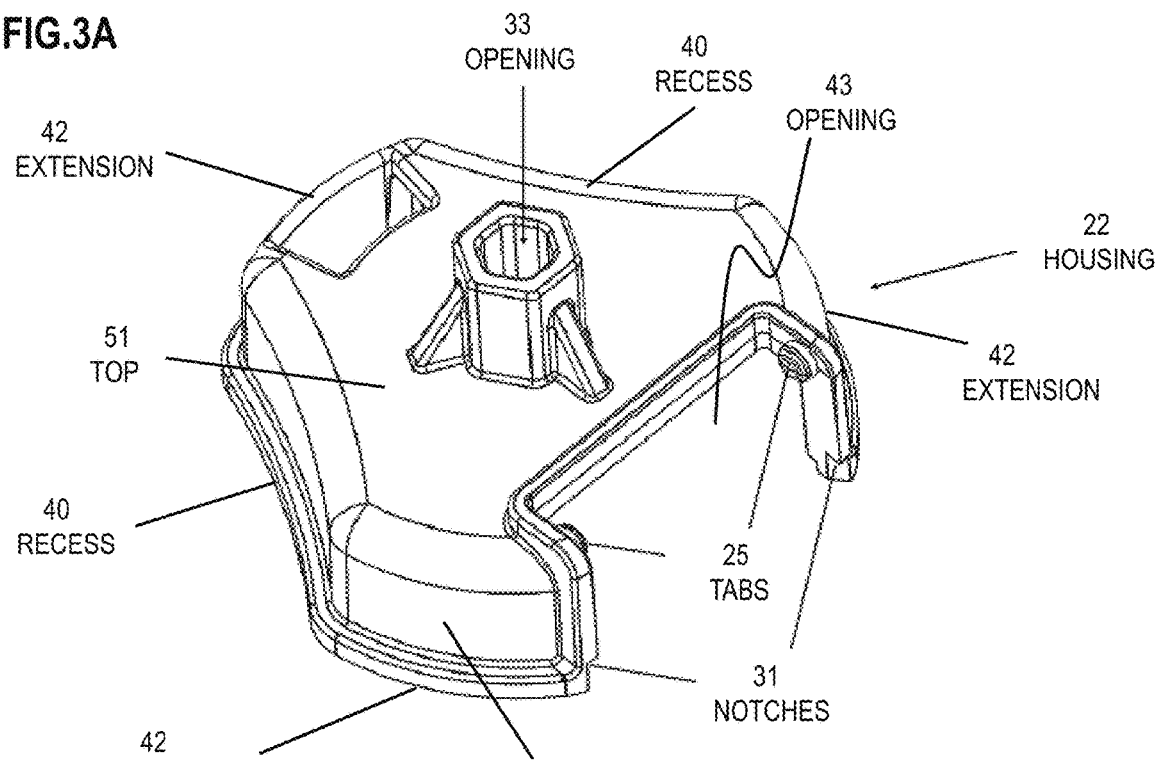
FIG. 3A is an image that illustrates an example of a top perspective view of a housing of the handle attachment device of FIG. 1, according to an embodiment.
Figure 3B:
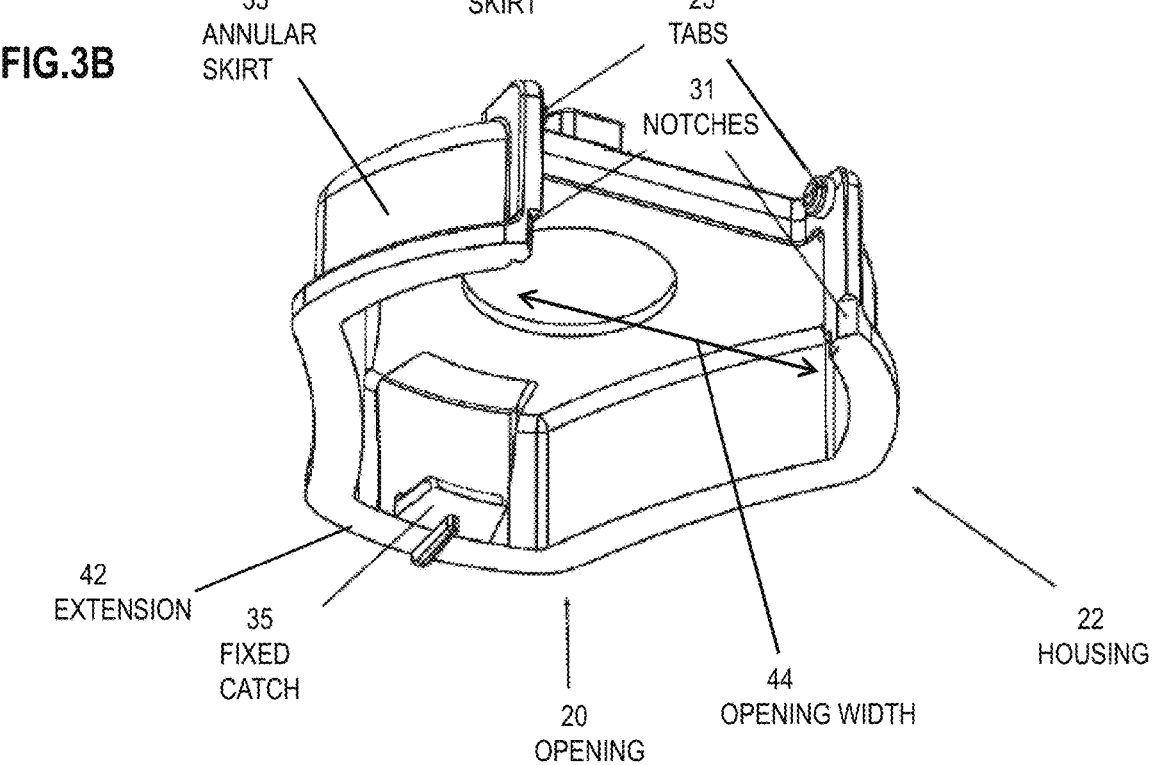
FIG. 3B is an image that illustrates an example of a bottom perspective view of a housing of the handle attachment device of FIG. 1, according to an embodiment.

FIG. 3A is an image that illustrates an example of a top perspective view of a housing 22 of the handle attachment device 16 of FIG. 1, according to an embodiment. FIG. 3B is an image that illustrates an example of a bottom perspective view of the housing 22 of the handle attachment device 16 of FIG. 1, according to an embodiment. The housing 22 includes an opening 33 at a center of the housing 22. In an embodiment, the opening 33 has a cross-section that is complimentary with a cross-section of the second end of the extension shaft 14. In an example embodiment, the cross-section of the opening 33 is similar to the cross-section of the opening 18 discussed above. In another example embodiment, the second end of the extension shaft 14 is affixed within the opening 33 using similar techniques as discussed above with respect to affixing the first end of the extension shaft 14 within the opening 18 of the handle 12.

In an embodiment, the housing 22 is shaped based on a shape of a rotatable knob 110 (FIGS. 7A-7B) of the closure valve 200 so that the housing 22 is adapted to fit over and around the rotatable knob 110 of the closure valve 200. In one embodiment, the housing 22 includes an opening 20 that has a cross-section that is compatible with an outer surface of the rotatable knob 110 of the closure valve 200. The housing 22 includes a housing top 51 and an annular skirt 53 that extends around a perimeter of the housing 22. In an embodiment, the housing top 51 of the housing 22 is coextensive and/or adjacent and/or parallel with a rotatable knob top 151 of the rotatable knob 110 when the housing 22 is fit over the rotatable knob 110 (FIGS. 7A-7D). In an example embodiment, the annular skirt 53 has a height of about 0.64 inches or in a range from about 0.5 inches to about 1 inch. In an embodiment, the housing 22 includes a perimeter with a plurality of extensions 42 and a plurality of recesses 40, where each extension 42 is separated from the center (e.g. the opening 33) of the housing 22 by a greater distance than each recess 40. In some embodiments, the housing top 51 and the annular skirt 53 are also defined by the plurality of extensions 42 and plurality of recesses 40. In an example embodiment, each extension 42 is separated from the center by about 1¼ inches and each recess 40 is separated from the center by about 1 inch. In an example embodiment, each recess 40 is positioned between two extensions 42 and each extension 42 is positioned between two recesses 40. In another example embodiment, each recess 40 is positioned along the housing 22 perimeter radially opposite from an extension 42 and each extension 42 is positioned along the housing 22 perimeter radially opposite from an extension 40. In an example embodiment, the number of extensions 42 and recesses 40 of the housing 22 is based on a number of extensions 142 and recesses 140 (FIGS. 7A-7B) on the rotatable knob 110 of the closure valve 200. In an example embodiment, where the rotatable knob 110 of the closure valve 200 has three extensions 142 and three recesses 140 (e.g. closure valve 200 of a propane tank 27), the housing 22 includes three recesses 40 and three extensions 42. In an example embodiment, the housing 22 is made from nylon-based plastic material.

In some embodiments, an opening 43 is formed in the housing 22 at a location along the housing 22 perimeter. In an example embodiment, the opening 43 is formed in the annular skirt 53 along the housing 22 perimeter. In another example embodiment, the opening 43 is formed in the annular skirt 53 and in a portion of the housing top 51 of the housing 22. In an embodiment, an attachment door 17 (FIGS. 4A-4C) that includes a pivoting catch 55 is pivotally attached to the housing 22 at the opening 43. In an example embodiment, the opening 43 is formed at a location along the housing 22 perimeter between two adjacent extensions 42 or at a location corresponding to one of the recesses 40 or both. In one example embodiment, the opening 43 is formed such that a center of the opening 43 corresponds with a midpoint between the two adjacent extensions 42. In some embodiments, the housing 22 could be designed such that the opening 43 is formed at an extension 42 and the fixed catch 35 is formed at a recess 40 that is positioned radially opposite from the extension 42 where the opening 43 is formed. In an example embodiment, an opening width 44 of the opening 43 is about 1¼ inches or in a range from about 1 inch to about 2 inches. A pair of tabs 25 is provided on the inner surface 37 of the housing 22 at the opening 43. Additionally, a pair of notches 31 is provided on the inner surface 37 of the housing 22 at the opening 43. In an example embodiment, the tabs 25 are circular with a diameter of about 1 mm and a height of about 1 mm. In one example embodiment, the tabs 25 include a step-down diameter from a first diameter of about 0.150" to a second diameter of about 0.05" that is less than the first diameter. In another example embodiment, the notches 31 each have a length of about 1 mm, a width of about 1 mm and a height of about 1 mm. In one embodiment, the notches 31 include a first pair of notches 31a (FIG. 3D) on an outer surface of the housing 22 and a second pair of notches 31b on the inner surface 37 of the housing 22. In an example embodiment, the first pair of notches 31a are provided to facilitate rotation of the attachment door 17 through the opening 43 and frictionally engage the attachment door 17 as it passes through the opening 43. In an example embodiment, the second pair of notches 31b are provided to facilitate holding the attachment door 17 in a fixed position within the opening 43, as discussed below. FIG. 3D is an image that illustrates an example of a side perspective view of notches 31 and tabs 25 of the housing 22 of FIG. 3C, according to an embodiment.

Figure 3C:
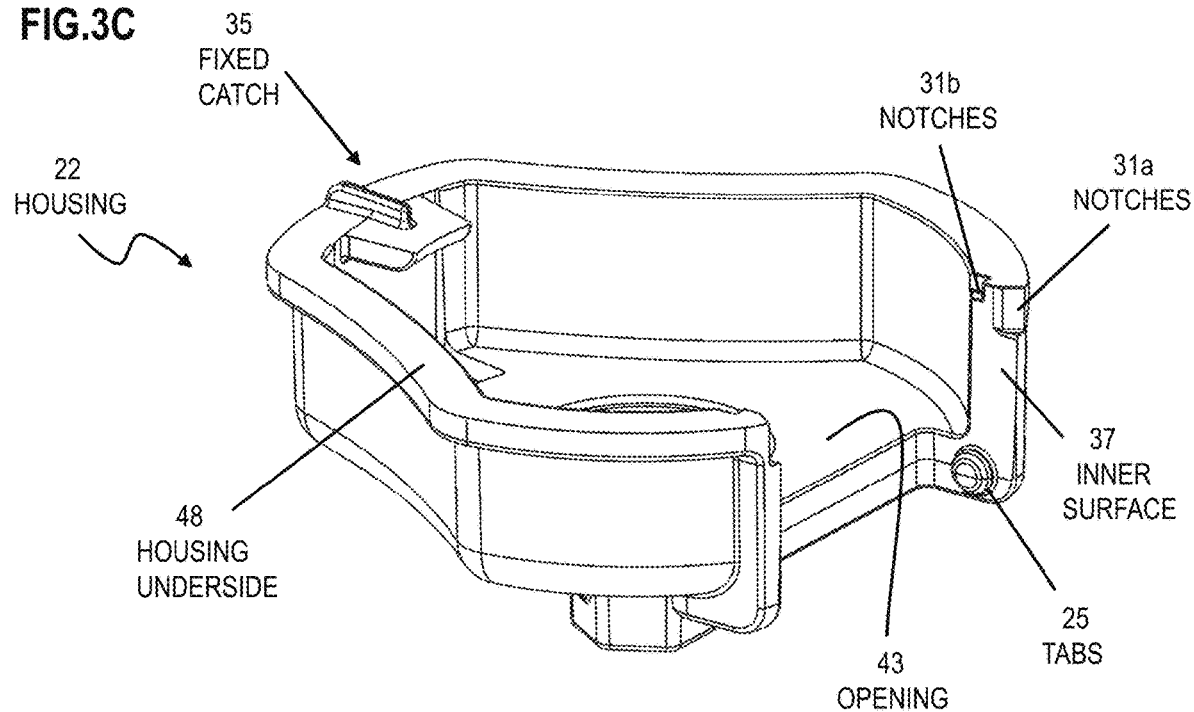
FIG. 3C is an image that illustrates an example of a side perspective view of a housing of the handle attachment device of FIG. 1, according to an embodiment.
Figure 3D:
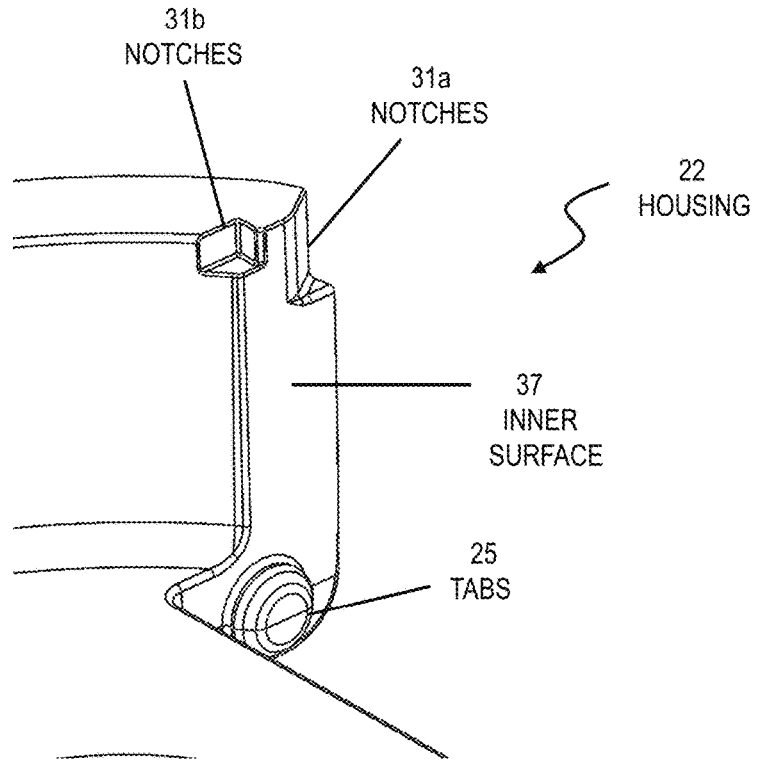
FIG. 3D is an image that illustrates an example of a side perspective view of notches and tabs of the housing of FIG. 3C, according to an embodiment.

FIG. 3C is an image that illustrates an example of a side perspective view of the housing 22 of the handle attachment device 16 of FIG. 1, according to an embodiment. FIG. 3E is an image that illustrates an example of a bottom perspective view of the housing 22 of the handle attachment device 16 of FIG. 1, according to an embodiment. FIG. 3F is an image that illustrates an example of a top view of a housing of the handle attachment device FIG. 1, according to an embodiment. In an embodiment, a non-pivoting catch or fixed catch 35 is provided that extends radially inward toward the center (e.g. opening 33) of the housing 22. In an example embodiment, the fixed catch 35 is integral with an underside 48 of the housing 22. In another example embodiment, the fixed catch 35 does not rotate or pivot during engagement of the rotatable knob 110 with the housing 22. In another example embodiment, the fixed catch 35 includes a planar component 46 that is aligned in a radial plane defined by the underside 48 of the housing 22. In another embodiment, as depicted in FIG. 3B and FIG. 3E, the fixed catch 35 is located at a radial position along the perimeter of the housing 22 (e.g. extension 42) that is radially opposite from the radial position of the opening 43 (e.g. between two adjacent extensions 42). In an example embodiment, a width of the fixed catch 35 is about ¼ inch. In another example embodiment, a width of the fixed catch 35 increases from a first width (e.g. about ⅜ inch) where the fixed catch 35 intersects the housing 22 to a second width (e.g. about ¼ inch) at an outward radial end of the fixed catch 35. In one embodiment, one function of the fixed catch 35 is to position under a lower surface 144 of a rotatable knob 110 for stability to engage the rotatable knob 110 with the housing 22.

Figure 4A:
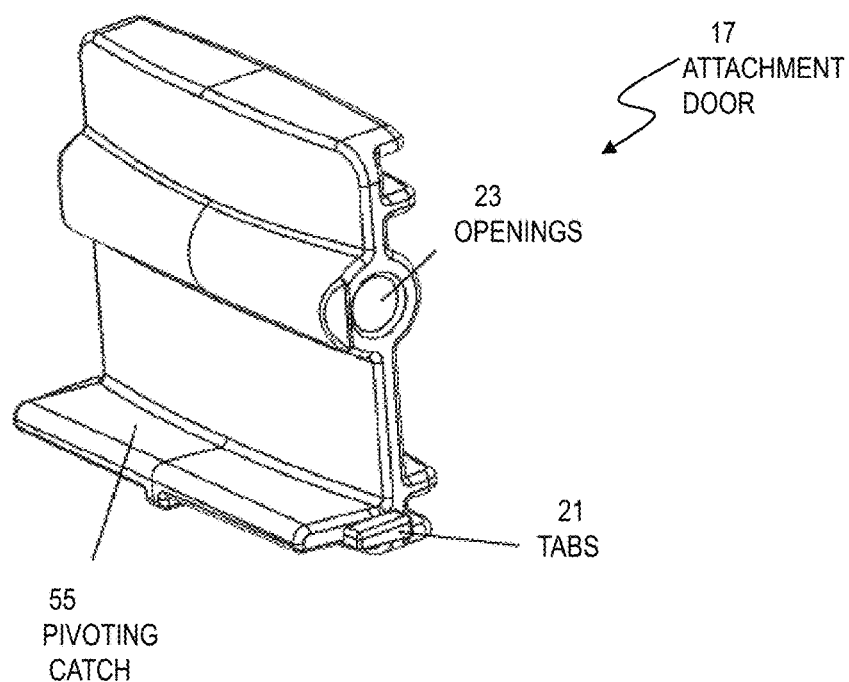
FIG. 4A is an image that illustrates an example of an upper front perspective view of a pivoting catch of the handle attachment device of FIG. 1, according to an embodiment.
Figure 4B:
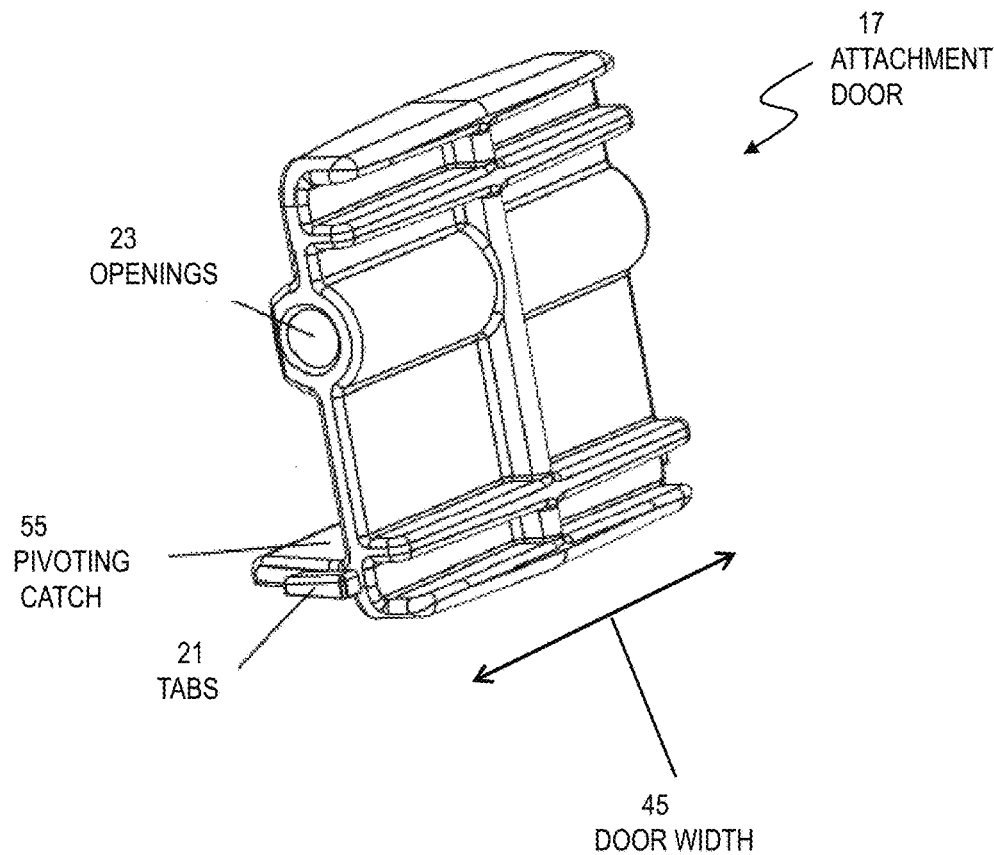
FIG. 4B is an image that illustrates an example of a rear perspective view of a pivoting catch of the handle attachment device of FIG. 1, according to an embodiment.

FIG. 4A is an image that illustrates an example of a front perspective view of a pivoting catch 55 of the handle attachment device 16 of FIG. 1, according to an embodiment. FIG. 4B is an image that illustrates an example of a rear perspective view of the pivoting catch 55 of the handle attachment device 16 of FIG. 1, according to an embodiment. FIG. 4C is an image that illustrates an example of a front perspective view of the pivoting catch 55 of the handle attachment device 16 of FIG. 1, according to an embodiment. In an embodiment, the attachment door 17 includes the pivoting catch 55 that is pivotally attached to the housing 22 at the opening 43 and extends radially inward relative to the attachment door 17 toward the center (e.g. opening 33) of the housing 22. In one embodiment, the attachment door 17 includes a pair of openings 23 on opposite sides of the attachment door 17 that are sized to rotatably receive the tabs 25 on the inner surface of the housing 22 at the opening 43, to pivotally attach the attachment door 17 to the housing 22 at the opening 43. In an example embodiment, an inner diameter of the openings 23 is adjusted based on an outer diameter of the tabs 25 so to accommodate the tabs 25 being rotatably received within the openings 23. In an example embodiment, the inner diameter of the openings 23 is greater (e.g. about 10%) than the outer diameter of the tabs 25.

In an embodiment, the pivoting catch 55 includes a pair of tabs 21 located at opposite sides of the attachment door 17. The tabs 21 are rectangular in shape with a length of about 2 mm, a width of about ½ mm and a height of about ½ mm. In some embodiments, a door width 45 of the attachment door 17, inclusive of the tabs 21, is greater than the opening width 44 of the opening 43. This advantageously causes the tabs 21 to slidably engage the notches 31a when the attachment door 17 is rotated within the opening 43. In an example embodiment, the door width 45 of the attachment door 17 is about 1⅝ inches or in a range from about 1 inch to about 2 inches.

In an embodiment, the pivoting catch 55 extends from a base of the attachment door 17 in a direction that is about orthogonal to a portion of the attachment door 17 defining the openings 23. In an example embodiment, the pivoting catch 55 has a width of about 1¼ inches. In some embodiments, the width of the pivoting catch 55 is about equal to or within ±10% of the opening width 44 of the opening 43 so that the pivoting catch 55 fits securely within the opening 43.

Figure 5A:
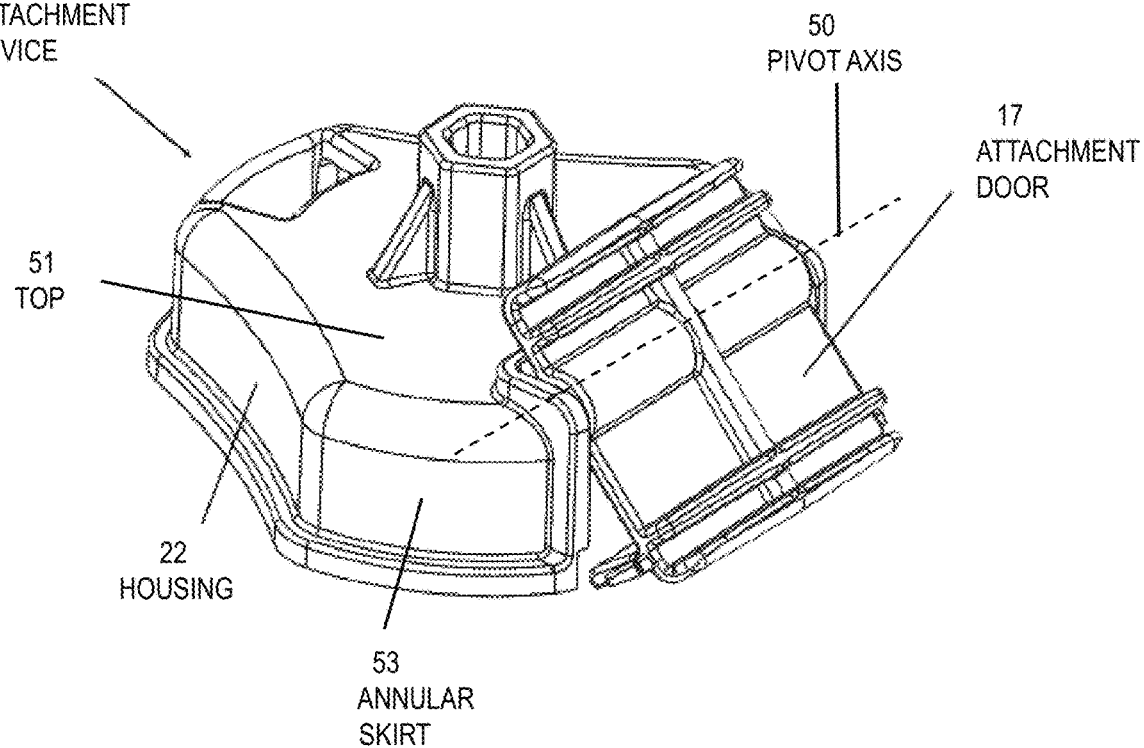
FIG. 5A is an image that illustrates an example of a top perspective view of a handle attachment device of the apparatus of FIG. 1, according to an embodiment.
Figure 5B:
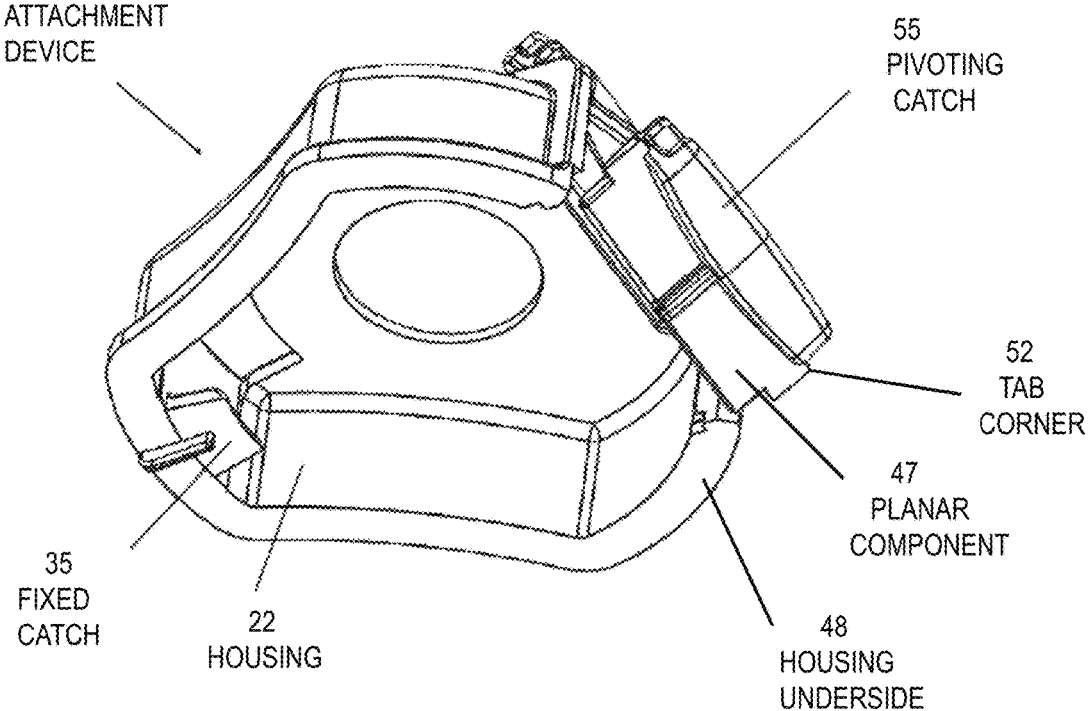
FIG. 5B is an image that illustrates an example of a bottom perspective view of a handle attachment device of the apparatus of FIG. 1, according to an embodiment.
Figure 7A:
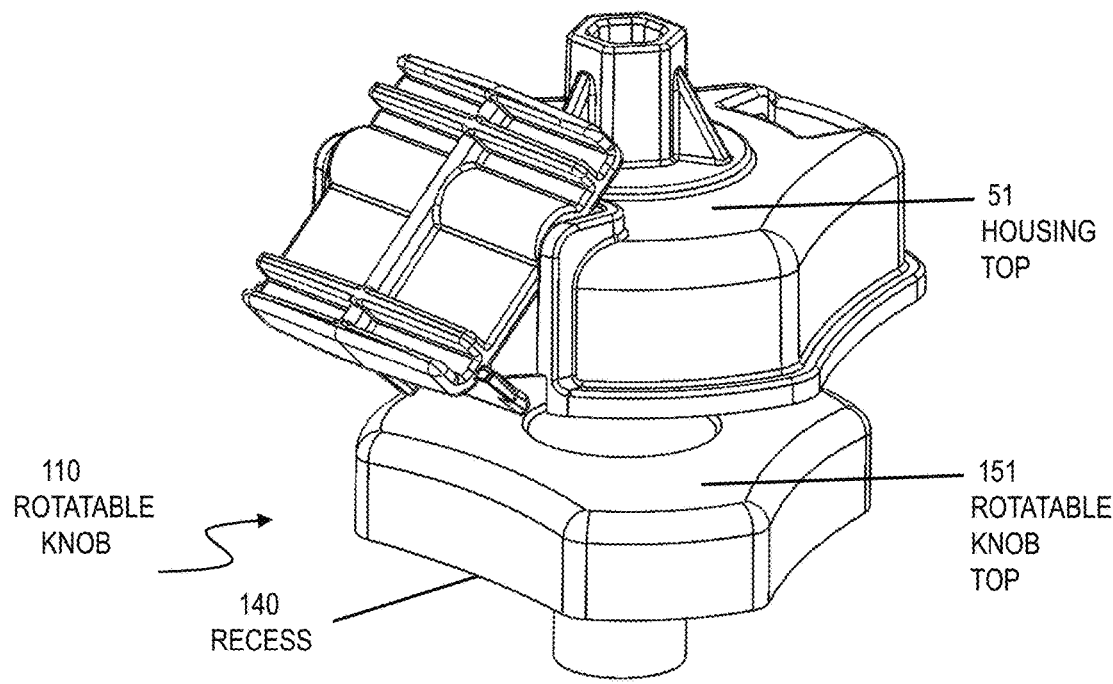
FIG. 7A is an image that illustrates an example of a top perspective view of the handle attachment device of FIG. 5A moving into engagement with the rotatable knob, according to an embodiment.
Figure 7B:
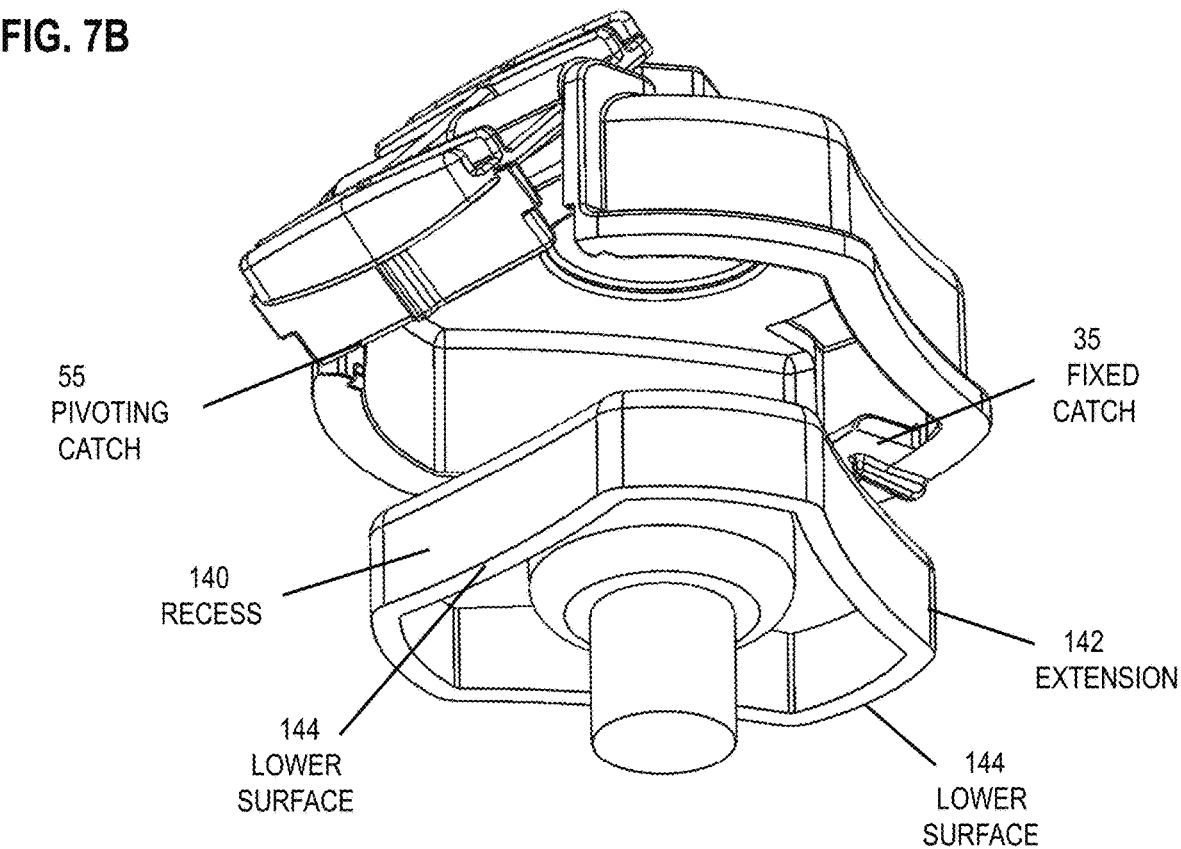
FIG. 7B is an image that illustrates an example of a bottom perspective view of the handle attachment device of FIG. 5A moving into engagement with the rotatable knob, according to an embodiment.
Figure 7C:
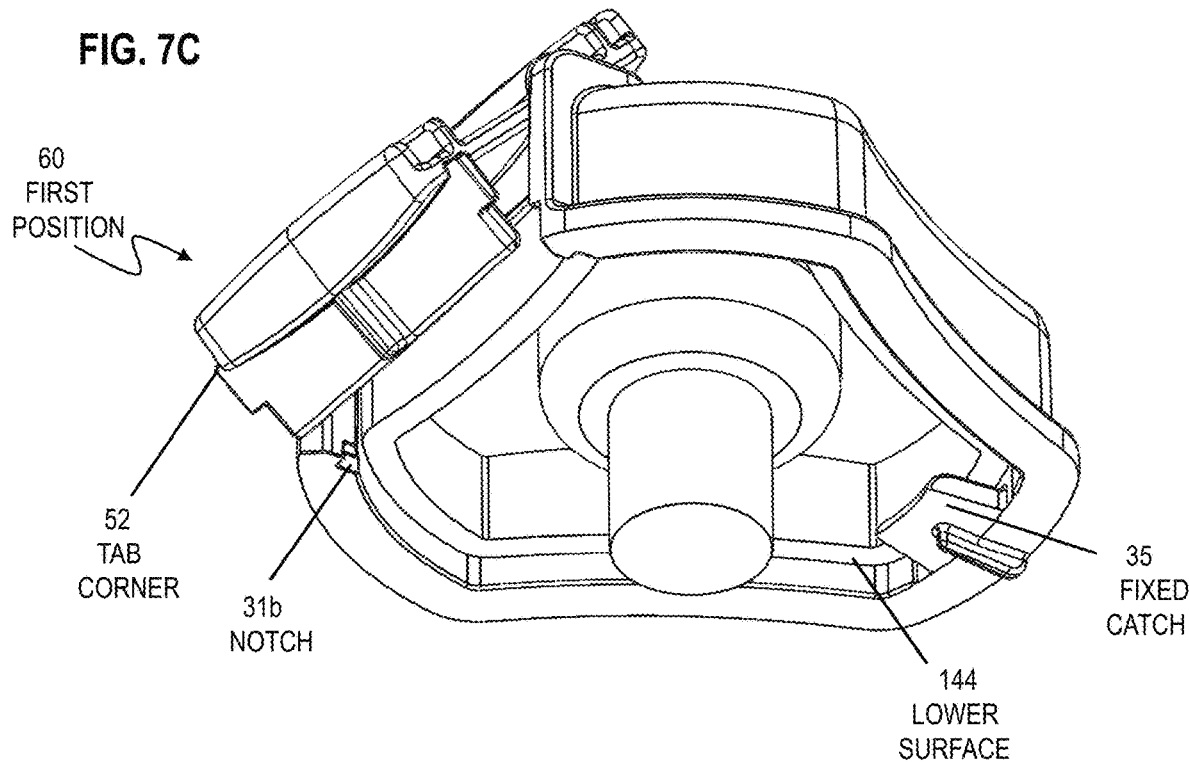
FIG. 7C is an image that illustrates an example of a bottom perspective view of a fixed catch and a pivoting catch in a first position of the handle attachment device of FIG. 5A engaging a lower surface of the rotatable knob, according to an embodiment.
Figure 7D:
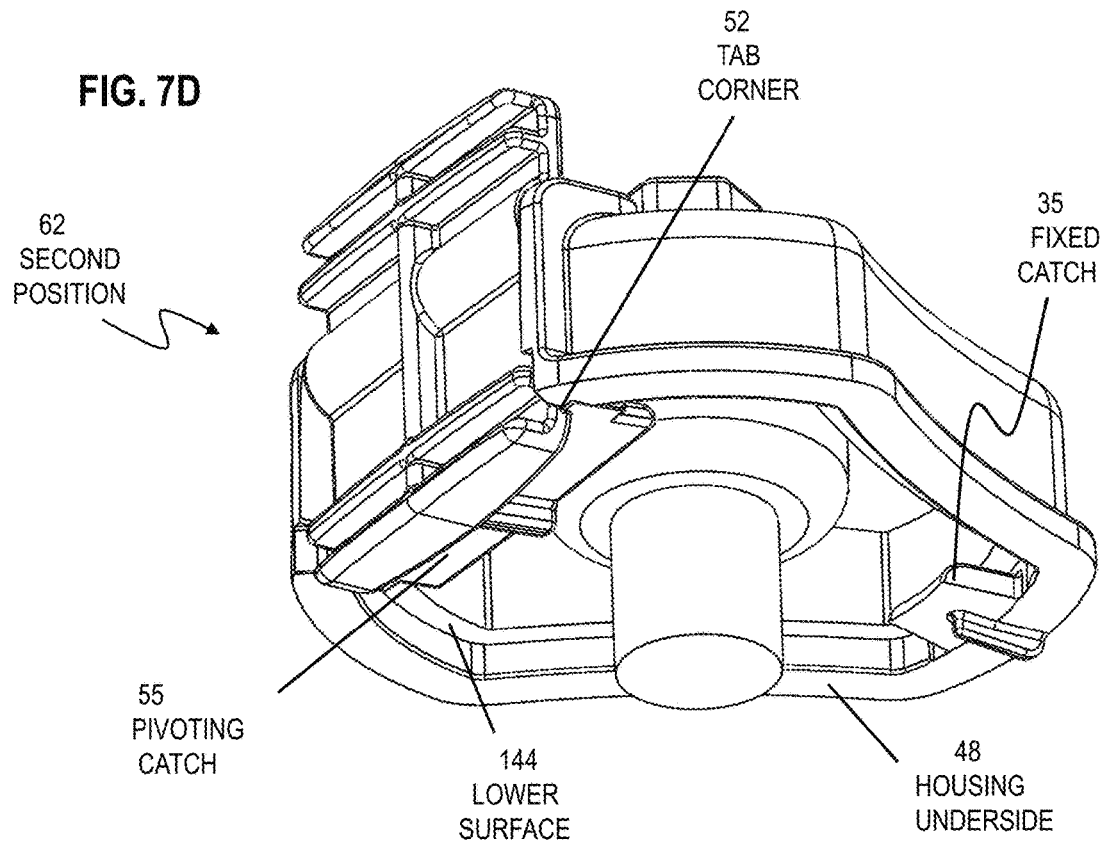
FIG. 7D is an image that illustrates an example of a bottom perspective view of a pivoting catch of the handle attachment device of FIG. 5A moved from a first position to a second position to engage a lower surface of the rotatable knob, according to an embodiment.

FIG. 5A is an image that illustrates an example of a top perspective view of the handle attachment device 16 of the apparatus 10 of FIG. 1, according to an embodiment. FIG. 5B is an image that illustrates an example of a bottom perspective view of the handle attachment device 16 of the apparatus 10 of FIG. 1, according to an embodiment. In one embodiment, FIG. 5A depicts the attachment door 17 including the pivoting catch 55 pivotally attached to the housing 22 at a pivot axis 50. In an embodiment, the attachment door 17 including the pivoting catch 55 is pivotally attached to the housing 22 at the pivot axis 50 by rotatably securing the tabs 25 of the housing 22 within the openings 23 of the attachment door 17. In an embodiment, the attachment door 17 is pivotally coupled to the housing 22 such that the pivoting catch 55 is pivotal relative to the housing top 51 and annular skirt 53 of the housing 22. In another embodiment, the attachment door 17 is pivotally coupled to the housing 22 such that the attachment door 17 closes the opening 43 (FIG. 3A) when the pivoting catch 55 is moved from a first position 60 (FIG. 7C) to a second position 62 (FIG. 7D).

In some embodiments, the housing 22 only includes the non-pivoting catch (e.g. fixed catch 35) and the pivoting catch 55, without any other catches. In other embodiments, more than one non-pivoting catch and/or more than one pivoting catches are provided along the perimeter of the housing 22.

Although steps are depicted in FIG. 6 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

FIG. 6 is a flow diagram that illustrates an example of a method 600 for engaging a closure valve 200, according to an embodiment. In step 601, a lower surface 144 of a rotatable knob 110 of a closure valve 200 is engaged with the non-pivoting catch or fixed catch 35 of the housing 22 of the handle attachment device 16. FIG. 7A is an image that illustrates an example of a top perspective view of the 37 handle attachment device 16 of FIG. 5A moving into engagement with the rotatable knob 110, according to an embodiment. FIG. 7B is an image that illustrates an example of a bottom perspective view of the handle attachment device 16 of FIG. 5A moving into engagement with the rotatable knob 110, according to an embodiment. FIG. 7C is an image that illustrates an example of a bottom perspective view of the fixed catch 35 of the handle attachment device 16 of FIG. 5A engaging a lower surface 144 of the rotatable knob 110, according to an embodiment. In one embodiment, the rotatable knob 110 includes a plurality of recesses 140 and a plurality of extensions 142, where the number of recesses 140 and the number of extensions 142 correspond to the number of recesses 40 and extensions 42 in the housing 22. In an example embodiment, the rotatable knob 110 is for a closure valve 200 of a propane tank 27 which includes three recesses 140 and three extensions 142.

In an embodiment, in step 601 the housing 22 is moved down and tilted so that the fixed catch 35 is positioned under and engages the lower surface 144 of the rotatable knob 110. In one example embodiment, in step 601 the housing 22 is moved down and tilted so that the fixed catch 35 is positioned under and engages the lower surface 144 at an extension 142 of the rotatable knob 110. In one embodiment, this action is depicted between FIG. 7B and FIG. 7C. In an example embodiment, the fixed catch 35 is not pivoted or rotated during step 601.

FIG. 7D is an image that illustrates an example of a bottom perspective view of a pivoting catch 55 of the handle attachment device 16 of FIG. 5A engaging the lower surface 144 of the rotatable knob 110, according to an embodiment. In an embodiment, in step 603 the attachment door 17 including the pivoting catch 55 pivotally attached to the housing 22 is moved about the pivot axis 50 from a first position 60 (FIG. 7C) to a second position 62 (FIG. 7D). In another embodiment, as the attachment door 17 is moved from the first position 60 to the second position 62, the attachment door 17 and pivoting catch 55 are pivoted relative to the housing top 51 and annular skirt 53 of the housing 22. In step 603, as the attachment door 17 and pivoting catch 55 are moved from the first position 60 to the second position 62, the tabs 21 of the attachment door 17 initially engage the notches 31a on an outer surface of the housing 22. In an embodiment, since the door width 45 of the attachment door 17 is greater than the opening width 44 of the opening 43 that separates the notches 31a, the tabs 21 of the attachment door 17 frictionally engage the notches 31a. In an embodiment, as the tabs 21 frictionally engage the notches 31a, the attachment door 17 is continuously moved until the tabs 21 pass over the notches 31a and engage the notches 31b on the inner surface of the housing 22 when the attachment door 17 reaches the second position 62. In an example embodiment, tab corners 52 of the tabs 21 engage the notches 31b and are securely fixed in the notches 31b so to securely hold the attachment door 17 in the second position 62.

In step 605, the lower surface 144 of the rotatable knob 110 is engaged with the pivoting catch 55 based on the movement of the attachment door 17 and pivoting catch 55 into the second position 62 in step 603. As depicted in FIG. 7D, when the attachment door 17 is rotated about the pivot axis 50 and into the second position 62, the pivoting catch 55 extends radially inward toward the center (e.g. opening 33) of the housing 22 and/or towards a center of the rotatable knob 110 such that the pivoting catch 55 engages the lower surface 144 of the rotatable knob 110. In an embodiment, in the second position 62 a planar component 47 of the pivoting catch 55 is aligned in a radial plane defined by the underside 48 of the housing 22. Additionally, in an embodiment, FIG. 7D depicts that the pivoting catch 55 is located at a radially opposite position from the fixed catch 35. In another embodiment, FIG. 7D depicts that a width of the fixed catch 35 is less than a width of the pivoting catch 55.

Figure 7E:
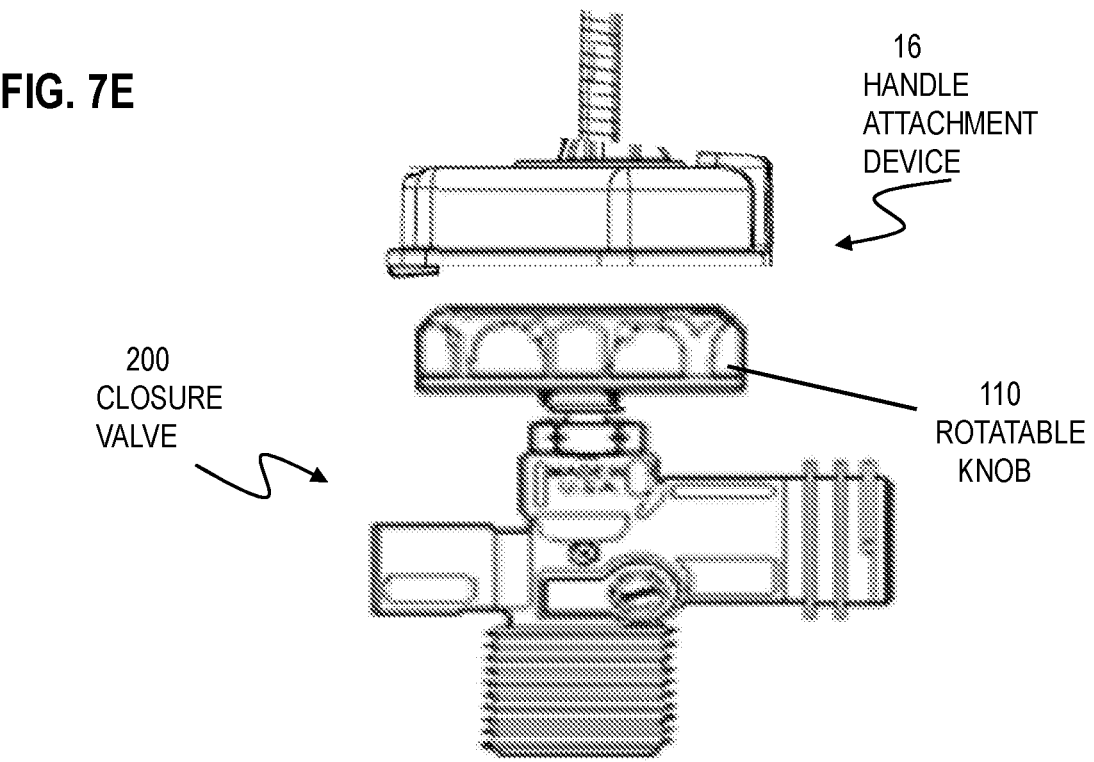
FIGS. 7E-7F are images that illustrate an example of a side perspective view of a handle attachment device of FIG. 5A moving into engagement with a rotatable knob of a closure valve of a propane tank, according to an embodiment.
Figure 7F:
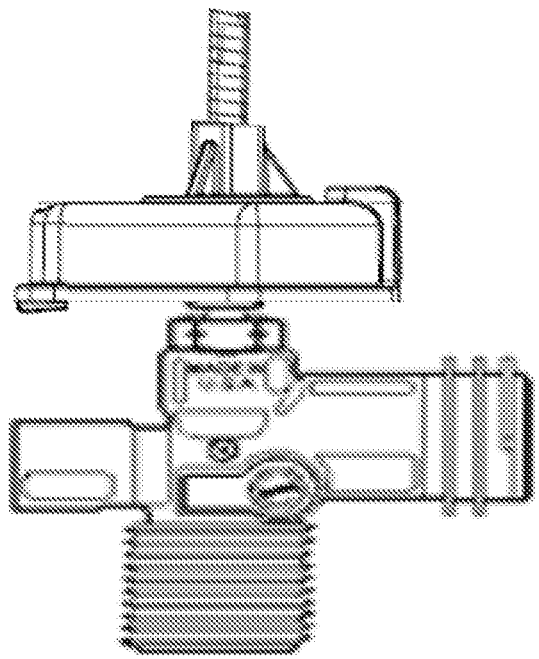

FIGS. 7E-7F are images that illustrate an example of a side perspective view of the handle attachment device 16 of FIG. 5A engaging a rotatable knob 110 of a closure valve 200 of a propane tank 27, according to an embodiment. In an embodiment, the handle attachment device 16 is secured over the rotatable knob 110 of the closure valve 200 of the propane tank 27 used in conjunction with a gas grill 24 using steps 601, 603, 605.

In step 607, the first end of the extension shaft 14 is attached to the handle 12. In an example embodiment, in step 607 the first end of the extension shaft 14 is axially inserted into the opening 18 of the handle 12 using a sliding fit or press fit.

In step 609, the second end of the extension shaft 14 is attached to the handle attachment device 16. In an example embodiment, in step 609 the second end of the extension shaft 14 is axially inserted into the opening 33 of the housing 22 of the handle attachment device 16 using a sliding fit or press fit.

In step 611, the handle 12 is positioned at an extended location relative to the rotatable knob 110 of the closure valve 200. In an example embodiment, in step 611 the handle 12 is positioned at a location where a user can conveniently reach the handle 12 to turn the handle 12 and correspondingly turn the rotatable knob 110 to open or close the closure valve 200.

Figure 8A:
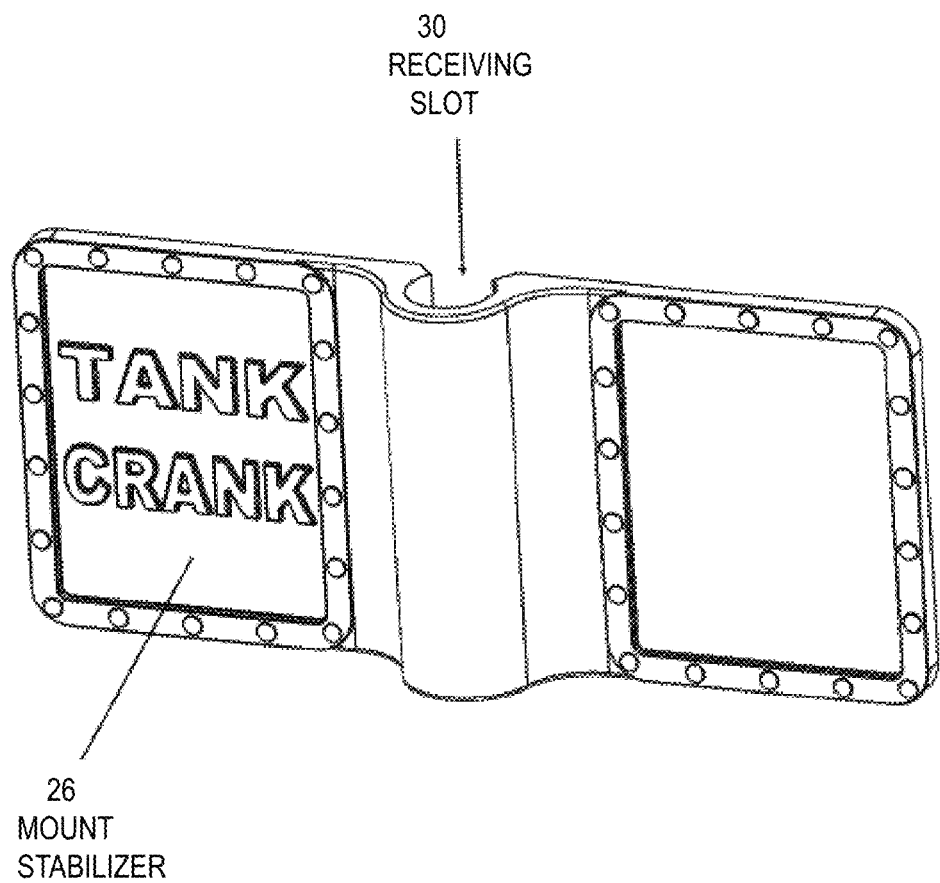
FIG. 8A is an image that illustrates an example of a front perspective view of a mount stabilizer used to secure the apparatus of FIG. 1 to an appliance, according to an embodiment.
Figure 8B:
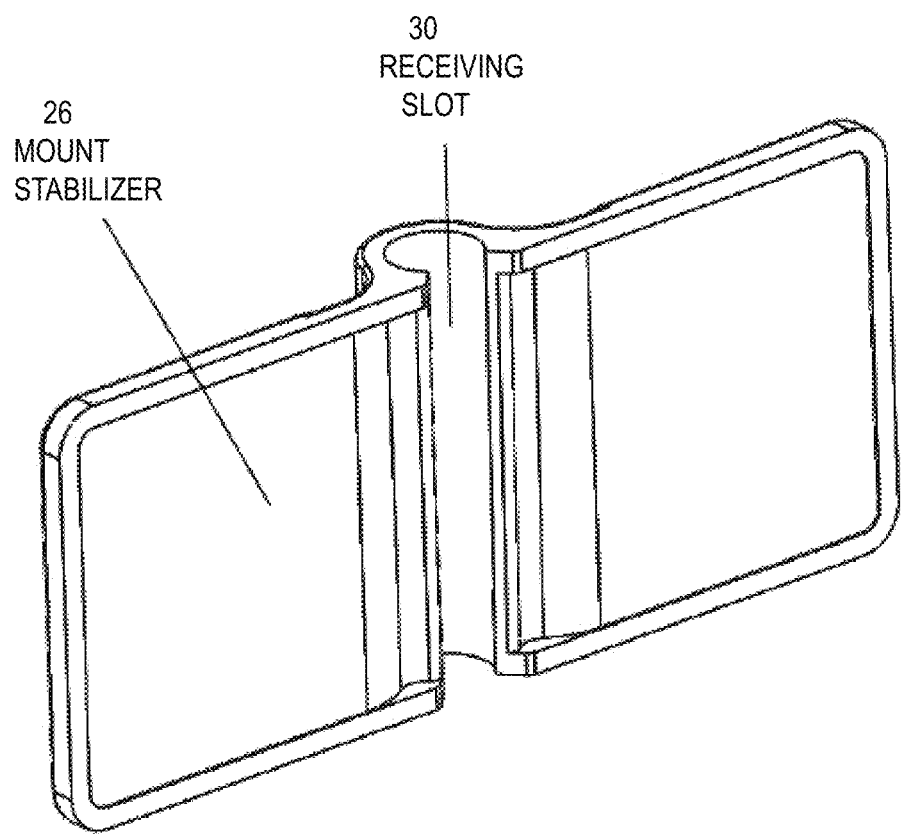
FIG. 8B is an image that illustrates an example of a rear perspective view of the mount stabilizer of FIG. 8A, according to an embodiment.
Figure 9:
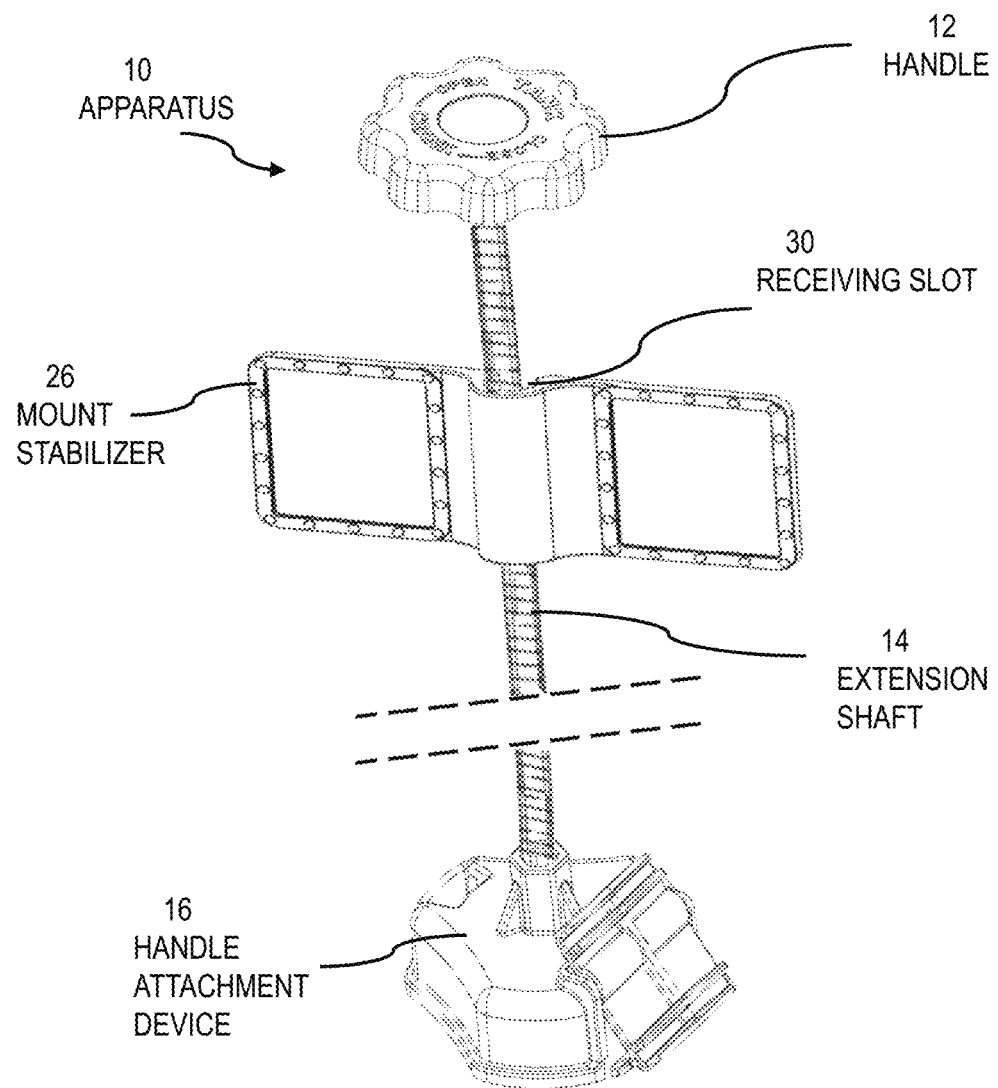
FIG. 9 is an image that illustrates an example of a perspective view of the apparatus of FIG. 1 with a handle attached to a first end of the extension shaft and handle extension device attached to a second end of the extension shaft, according to an embodiment.

In some embodiments, in step 611 the handle 12 is positioned at an extended location on an external surface of an appliance used in conjunction with the closure valve 200. FIG. 8A is an image that illustrates an example of a front perspective view of a mount stabilizer 26 used to secure the extension shaft 14 of the apparatus 10 of FIG. 1 to an appliance, according to an embodiment. FIG. 8B is an image that illustrates an example of a rear perspective view of the mount stabilizer 26 of FIG. 8A, according to an embodiment. In an embodiment, in step 611 the extension shaft 14 is slidably received within a receiving slot 30 of the mount stabilizer 26. In an example embodiment, the receiving slot 30 has an inner diameter that is based on an outer diameter of the extension shaft 14. In another example embodiment, the receiving slot 30 has a width that is less than the outer diameter of the extension shaft 14 so that the extension shaft 14 frictionally engages the mount stabilizer 26 to secure the extension shaft 14 within the receiving slot 30. FIG. 9 is an image that illustrates an example of a perspective view of the apparatus 10 of FIG. 1 with the extension shaft 14 received in the receiving slot 30 of the mount stabilizer 26, according to an embodiment. In one embodiment, FIG. 9 depicts the handle 12 attached to a first end of the extension shaft 14 and the handle extension device 16 attached to a second end of the extension shaft 14.

Figure 10:
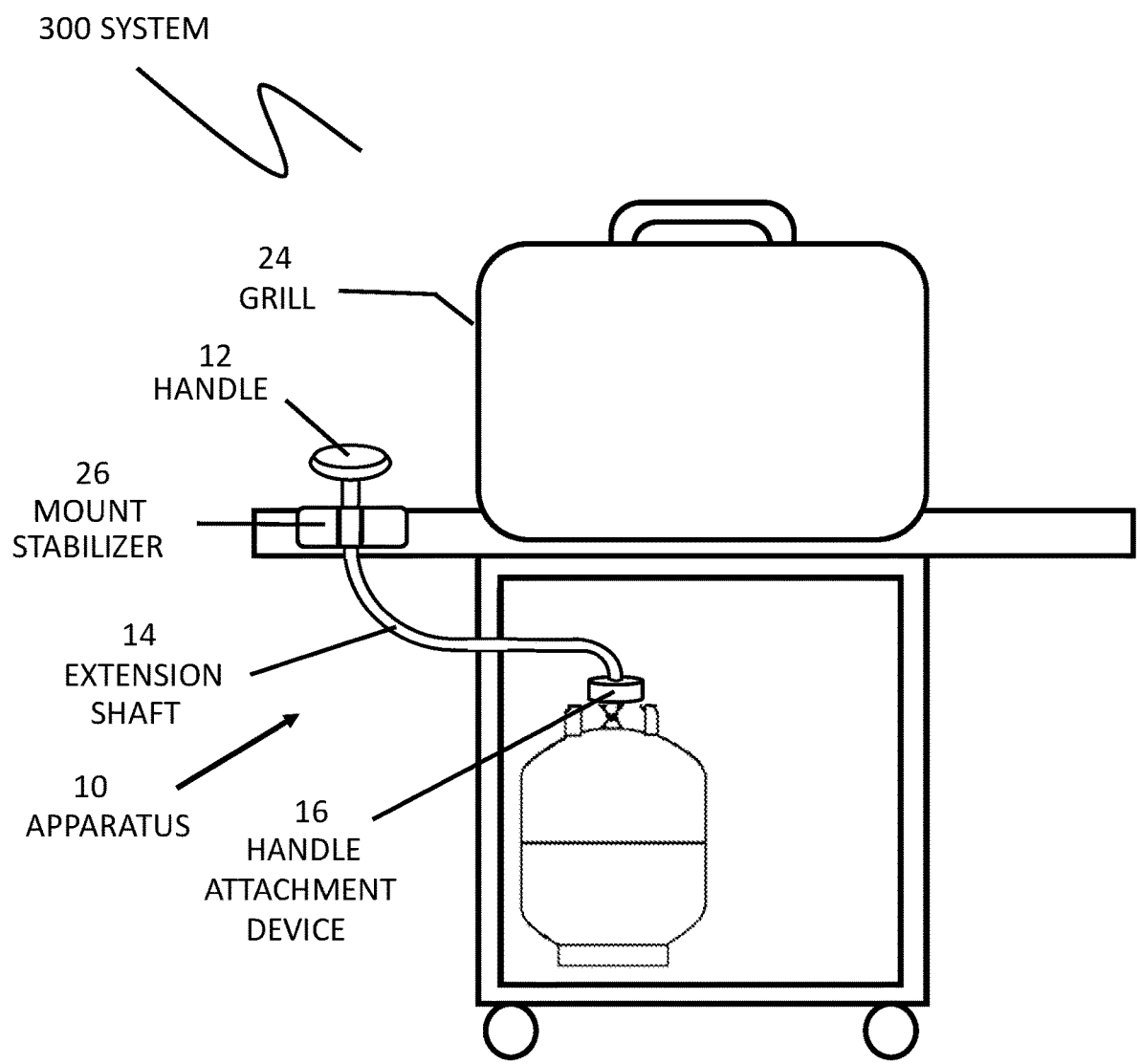
FIG. 10 is an image that illustrates an example of a system including the apparatus of FIG. 1 used to engage the closure valve of a propane tank used in conjunction with a grill, according to an embodiment.

In an embodiment, in step 611 after the extension shaft 14 is received in the receiving slot 30 of the mount stabilizer 26, the mount stabilizer 26 is secured to an external surface of an appliance (e.g. grill 24) used in conjunction with the closure valve 200. FIG. 10 is an image that illustrates an example of a system 300 including the apparatus 10 of FIG. 1 used to extend the closure valve 200 of a propane tank 27 used in conjunction with a grill 24, according to an embodiment. In one embodiment, the mount stabilizer 26 is secured to the external surface of the grill 24 using a magnet on the mount stabilizer 26. In another embodiment, the mount stabilizer 26 is secured to the external surface of the grill 24 using a hook and loop (e.g. Velcro®) attachment. As depicted in FIG. 10, in one embodiment the mount stabilizer 26 is secured to an external surface of the grill 24 such that the handle 12 is positioned at an extended location relative to the closure valve 200 of the propane tank 27 that is convenient for the user to grasp the handle 12 while using the grill 24.

In an embodiment, in step 613 a rotational position of the handle 12 is adjusted by the user to adjust a rotational position of the rotatable knob 110 to vary a flow through the closure valve 200. In an example embodiment, in step 613 a rotational position of the handle 12 is adjusted by the user to adjust the rotational position of the rotatable knob 110 to vary a flow of propane through the closure valve 200 of the propane tank 27 while using the grill 24. In an example embodiment, in step 613 prior to using the grill 24 the user turns the handle 12 in the first direction (e.g. counter clockwise) based on the directional marking 19a to rotate the rotatable knob 110 and open the closure valve 200 to increase a flow of propane from the propane tank 27 to the grill 24. In another example embodiment, in step 613 after using the grill 24 the user turns the handle 12 in the second direction (e.g. clockwise) based on the directional marking 19b to rotate the rotatable knob 110 and close the closure valve 200 to stop the flow of propane from the propane tank 27 to the grill 24.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. An apparatus for engaging a closure valve, comprising:
   an extension shaft having a first end and a second end;
   a handle attached to the first end of the extension shaft;
   a handle attachment device attached to the second end of the extension shaft and adapted to fit over and around a rotatable knob of the closure valve; and
   wherein the handle attachment device includes a housing having;
      a first non-pivoting catch, and
      a second pivoting catch,
         wherein the first non-pivoting catch and the second pivoting catch extend from an underside of the housing radially inward toward a center of the housing such that the first non-pivoting catch and the second pivoting catch are configured to engage a lower surface of the rotatable knob when the housing is fit over and around the rotatable knob
      wherein a width of the first non-pivoting catch is less than a width of the second pivoting catch.

2. An apparatus as recited in claim 1, wherein the first non-pivoting catch comprises a fixed catch integral with the housing.

3. An apparatus as recited in claim 1, wherein the second pivoting catch is configured to rotate about a pivot axis from a first position to a second position and wherein the second pivoting catch extends radially inward toward the center of the housing in the second position.

4. An apparatus as recited in claim 1, wherein the housing includes an annular skirt and a top that is coextensive with a top of the rotatable knob when the housing is fit over and around the rotatable knob, wherein the second pivoting catch extends radially inward relative to an attachment door towards the center of the housing and wherein the attachment door is pivotally coupled to the housing such that the second pivoting catch is pivotal relative to the top and the annular skirt of the housing.

5. An apparatus as recited in claim 1, wherein the first non-pivoting catch and the second pivoting catch each include a planar component aligned in a radial plane defined by the underside of the housing.

6. An apparatus as recited in claim 1, wherein the housing only includes the first non-pivoting catch and the second pivoting catch.

7. An apparatus as recited in claim 1, wherein the first non-pivoting catch and the second pivoting catch are located at radially opposite positions relative to each other.

8. An apparatus as recited in claim 1, wherein an edge of a perimeter of the housing includes a plurality of extensions and a plurality of recesses, wherein each extension is separated from the center of the housing by a greater distance than each recess, and wherein the first non-pivoting catch is attached to the housing at one of the extensions and recesses and wherein the second pivoting catch is attached to the housing at another of the extensions and recesses.

9. An apparatus as recited in claim 8, wherein the first non-pivoting catch is attached to the housing at one of the extensions and wherein the second pivoting catch is attached to the housing at one of the recesses that is radially opposite from the first non-pivoting catch.

10. An apparatus as recited in claim 1, further comprising a mount stabilizer including a receiving slot configured to receive the extension shaft, wherein the mount stabilizer is configured to be attached to an exterior surface of an appliance used in conjunction with the closure valve.

11. An apparatus as recited in claim 1, wherein the closure valve is a closure valve of a propane tank used in conjunction with a propane-fueled grill and wherein the housing of the handle attachment device includes an opening with a cross section compatible with an outer surface of the rotatable knob of the closure valve of the propane tank such that the housing is configured to fit over and around the rotatable knob of the closure valve of the propane tank.

12. An apparatus for engaging a closure valve, comprising:
an extension shaft having a first end and a second end;
a handle attached to the first end of the extension shaft;
a handle attachment device attached to the second end of the extension shaft and adapted to fit over and around a rotatable knob of the closure valve; and
wherein the handle attachment device includes a housing having;
a first non-pivoting catch, and
a second pivoting catch,
wherein the first non-pivoting catch and the second pivoting catch extend from an underside of the housing radially inward toward a center of the housing such that the first non-pivoting catch and the second pivoting catch are configured to engage a lower surface of the rotatable knob when the housing is fit over and around the rotatable knob
wherein the second pivoting catch is configured to rotate about a pivot axis from a first position to a second position and wherein the second pivoting catch extends radially inward toward the center of the housing in the second position,
and wherein the apparatus further comprises an attachment door that comprises the second pivoting catch, wherein the attachment door is pivotally attached to the housing at an opening in the housing, wherein the attachment door is configured to close the opening when the second pivoting catch is moved to the second position;
and wherein the attachment door includes one of;
a pair of tabs configured to engage a pair of notches in the housing to close the opening and extend the second pivoting catch radially inward toward the center of the housing and wherein a width of the attachment door is greater than a width of the opening, or
a pair of openings configured to rotatably receive a pair of tabs of the housing such that the attachment door is pivotally attached to the housing at the pivot axis.

13. An apparatus for engaging a closure valve, comprising:
an extension shaft having a first end and a second end;
a handle attached to the first end of the extension shaft;
a handle attachment device attached to the second end of the extension shaft and adapted to fit over and around a rotatable knob of the closure valve; and
wherein the handle attachment device includes a housing having a first and second catch on an underside thereof that extend radially inward toward a center of the housing such that the first and second catch are configured to engage a lower surface of the rotatable knob when the housing is fit over and around the rotatable knob, and wherein the first and second catch are located at radially opposite positions relative to each other; and
wherein a width of the first catch is less than a width of the second catch and wherein the first and second catch each include a planar component aligned in a radial plane defined by the underside of the housing.

14. An apparatus as recited in claim 13, wherein an edge of a perimeter of the housing includes a plurality of extensions and a plurality of recesses, wherein each extension is separated from the center of the housing by a greater distance than each recess, and wherein the first catch is a non-pivoting catch that is attached to the housing at one of the extensions and wherein the second catch is a pivoting catch that is attached to the housing at one of the recesses radially opposite from the extension where the first catch is attached.

15. An apparatus as recited in claim 13, wherein the first catch is a non-pivoting catch integral with the housing, wherein the second catch is a pivoting catch configured to rotate about a pivot axis from a first position to a second position where the pivoting catch extends radially inward toward the center of the housing in the second position.

* * * * *